United States Patent
Li et al.

(10) Patent No.: US 11,083,002 B2
(45) Date of Patent: Aug. 3, 2021

(54) CHANNEL STATE INFORMATION-REFERENCE SIGNAL TRANSMISSION METHOD AND DEVICE

(71) Applicant: ZTE Corporation, Shenzhen (CN)

(72) Inventors: Yong Li, Shenzhen (CN); Zhaohua Lu, Shenzhen (CN); Hao Wu, Shenzhen (CN); Chuangxin Jiang, Shenzhen (CN); Yu Ngok Li, Shenzhen (CN); Yijian Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 21 days.

(21) Appl. No.: 16/611,009

(22) PCT Filed: Jun. 15, 2018

(86) PCT No.: PCT/CN2018/091597
§ 371 (c)(1),
(2) Date: Nov. 5, 2019

(87) PCT Pub. No.: WO2018/202218
PCT Pub. Date: Nov. 8, 2018

(65) Prior Publication Data
US 2020/0084788 A1    Mar. 12, 2020

(30) Foreign Application Priority Data
May 5, 2017   (CN) .......................... 201710314181.9

(51) Int. Cl.
*H04W 72/12* (2009.01)
*H04L 5/00* (2006.01)
*H04W 84/04* (2009.01)

(52) U.S. Cl.
CPC ....... *H04W 72/1273* (2013.01); *H04L 5/0048* (2013.01); *H04W 84/042* (2013.01)

(58) Field of Classification Search
CPC ... H04L 5/0048; H04L 5/0051; H04L 5/0053; H04W 72/1273
See application file for complete search history.

(56) References Cited

U.S. PATENT DOCUMENTS

2015/0029966 A1* 1/2015 Park ................... H04L 5/0053
                                                        370/329
2015/0201369 A1* 7/2015 Ng ..................... H04L 25/0224
                                                        370/254
(Continued)

FOREIGN PATENT DOCUMENTS

| CN | 104106223 A | 10/2014 |
| CN | 106559199 A | 4/2017 |
| CN | 108111269 A | 6/2018 |

OTHER PUBLICATIONS

LG Electronics; On DL PT-RS design; 3GPP TSG RAN WG1 Meeting #88bis Spokane, USA Apr. 3-7, 2017 R1-1704890 (Year: 2017).*

(Continued)

*Primary Examiner* — Gary Mui
(74) *Attorney, Agent, or Firm* — Cantor Colburn LLP

(57) ABSTRACT

Provided are a channel state information-reference signal (CSI-RS) transmission method and device. The method includes following steps: a first communication node determines CSI-RS indication information; the first communication node transmits the CSI-RS indication information to a second communication node; the first communication node transmits or receives a CSI-RS according to the CSI-RS indication information; the component is used for constituting the CSI-RS resource, and the component is a set of resource elements having relative positional relations.

17 Claims, 4 Drawing Sheets

(56) References Cited

U.S. PATENT DOCUMENTS

| | | | |
|---|---|---|---|
| 2016/0212733 A1* | 7/2016 | Davydov | H04L 5/0094 |
| 2016/0242060 A1* | 8/2016 | Kakishima | H04B 7/0417 |
| 2016/0301511 A1 | 10/2016 | Yoon | |
| 2016/0359602 A1* | 12/2016 | Mazzarese | H04L 5/0051 |
| 2017/0202014 A1* | 7/2017 | Moon | H04L 5/005 |
| 2018/0054290 A1* | 2/2018 | Park | H04L 5/005 |
| 2018/0102817 A1* | 4/2018 | Park | H04B 7/04 |
| 2018/0262938 A1* | 9/2018 | Liu | H04B 7/0626 |
| 2018/0270032 A1* | 9/2018 | Li | H04L 5/00 |
| 2018/0287681 A1* | 10/2018 | Chen | H04L 5/0057 |
| 2018/0316470 A1* | 11/2018 | Li | H04L 5/0048 |
| 2018/0316471 A1* | 11/2018 | Li | H04L 5/005 |
| 2018/0323849 A1* | 11/2018 | Park | H04L 5/1469 |
| 2019/0149212 A1* | 5/2019 | Wang | H04W 24/10 370/329 |
| 2019/0190673 A1* | 6/2019 | Kwak | H04B 7/0421 |
| 2019/0312668 A1* | 10/2019 | Park | H04L 5/00 |
| 2019/0327058 A1* | 10/2019 | Jiang | H04L 5/005 |
| 2020/0021413 A1* | 1/2020 | Park | H04L 5/0026 |
| 2020/0092036 A1* | 3/2020 | Xu | H04L 1/0026 |
| 2020/0112355 A1* | 4/2020 | Park | H04B 7/0626 |
| 2020/0382190 A1* | 12/2020 | Pawar | H04B 7/0626 |
| 2020/0389270 A1* | 12/2020 | Lee | H04W 72/0406 |

OTHER PUBLICATIONS

International Search Report for corresponding application PCT/CN2018/091597 filed Jun. 15, 2018; dated Sep. 19, 2018.

\* cited by examiner

Group 1(Port 1,Port 2)
Group 2(Port 3,Port 4)
Group 3(Port 5,Port 6)
Group 4(Port 7,Port 8)

FIG. 4C

Group 1(Port 1,Port 2)
Group 2(Port 3,Port 4)
Group 3(Port 5,Port 6)
Group 4(Port 7,Port 8)

FIG. 4D

Group 1(Port 1,Port 2,
Port 3,Port 4)
Group 2(Port 5,Port 6,
Port 7,Port 8)

FIG. 4E

Group 1(Port 1,Port 2)
Group 2(Port 3,Port 4)
Group 3(Port 5,Port 6)
Group 4(Port 7,Port 8)

FIG. 4F

Group 1(Port 1,Port 2,Port 3,Port 4)

Group 2(Port 5,Port 6,Port 7,Port 8)

FIG. 4G

CHANNEL STATE INFORMATION-REFERENCE SIGNAL TRANSMISSION METHOD AND DEVICE

CROSS-REFERENCE TO RELATED APPLICATIONS

This is a National Stage Application, filed under 35 U.S.C. 371, of International Patent Application No. PCT/CN2018/091597, filed on Jun. 15, 2018, which claims priority to Chinese patent application No. 201710314181.9 filed on May 5, 2017, contents of both of which are incorporated herein by reference in their entireties.

TECHNICAL FIELD

The present disclosure relates to the field of communications and, in particular, to a channel state information reference signal transmission method and device.

BACKGROUND

Long term evolution (LTE)/advanced long term evolution (LTE-A) technology is a mainstream technology of fourth generation mobile communication (4G). A channel state information reference signal (CSI-RS) is introduced into the LTE-A for channel state prediction on terminal side. A CSI-RS transmitted with non-zero power is so called non-zero power CSI-RS (NZP CSI-RS). Sometimes, in order to avoid interference, it is necessary to avoid data transmission of some resource elements (REs) on a physical downlink shared channel (PDSCH), and the CSI-RS is transmitted in a zero power manner, which is called zero power CSI-RS (ZP CSI-RS), and a corresponding RE set is a zero power CSI-RS resource. Sometimes, in order to measure interference, the CSI-RS is transmitted in the zero power manner, and the corresponding RE set is called a channel state information interference measurement resource (CSI-IM resource).

A channel state information reference signal configuration, i.e., a CSI-RS configuration, is used to indicate a resource element (RE) to which the CSI-RS is mapped, that is, the RE is used to transmit the CSI-RS. A serial number of the CSI-RS configuration is used to distinguish different CSI-RS configurations. A CSI-RS subframe configuration is used to indicate the subframe in which the CSI-RS is transmitted.

A type of the CSI-RS configuration is a CSI-RS configuration with a certain number of antenna ports. For example, a CSI-RS configuration has a configuration serial number of 0 and a number of antenna ports of 8. Usually, the serial number of the configuration is an index number.

The related art supports CSI-RS resources with numbers of ports of 1, 2, 4, 8, 12 and 16, component patterns of the CSI-RS resources with these numbers of ports are carried on a transmission subframe, and the component patterns of the CSI-RS resources carried on the transmission subframe are repeated on each physical resource block (PRB) pair within a bandwidth range.

The CSI-RS resources with the number of ports of 1, 2, 4 or 8 is consisted of a single CSI-RS configuration, and the CSI-RS resource with the number of ports of 12, 16, 20, 24, 28 or 32 is aggregated by multiple CSI-RS configurations.

A base station or terminal usually measures a channel state through a channel state measurement process (CSI Process). At least one CSI-RS resource is usually configured under a CSI process, and the terminal feeds back the CSI-RS measurement.

In order to make full use of power and improve accuracy of channel measurement, ports may be divided into several groups, and ports within a same group operate in a code division multiplexing manner.

The base station notifies the terminal of information about the CSI-RS through an upper-layer signaling, the information includes CSI-RS resource configuration identity, the number of ports for the CSI-RS, a CSI-RS configuration, and a CSI-RS subframe configuration.

With development of manufacturing, life and scientific research technology, demands for 5th generation (5G) wireless communication technology are presented. 5G wireless technology is characterized by large bandwidth and massive-MIMO beam technologies, which needs to satisfy transmission requirements in cases of large data volume transmission, low delay transmission, interconnection and transmission of things and high speed transmission. 3rd generation partnership project (3GPP) has organized researches on a new radio (NR) access technology, an adaptive frequency range of NR is from 0.6 GHz to 100 GHz, an interval between subcarriers may be configured, and a length of a subframe or a slot in time domain may be configured. Data transmission may be implemented in a configured orthogonal frequency division multiplexing (OFDM) symbol, pattern and position of a data demodulation reference signal need to be configurable, and a beam may be changed between an OFDM symbol and another OFDM symbol, even within an OFDM symbol. NR also needs to incorporate CSI-RS to support channel state information measurement, beam management and channel phase tracking; NR requires a CSI-RS to be transmitted in three manners: periodic transmission, semi-persistent transmission and aperiodic transmission. At present, reference signal transmission methods satisfying these requirements require systems with high system complexity, and have poor performance in channel measurement.

There is thus high complexity, poor performance and high signaling overheads in wireless systems with a configurable time slot structure, variable multi-beams, a configurable data demodulation reference signal and a configurable phase tracking reference signal.

SUMMARY

The present disclosure provides a channel state information reference signal transmission method, device and base station, to provide a high-performance CSI-RS transmission, thereby reducing signaling overheads.

The present disclosure provides a channel state information reference signal (CSI-RS) transmission method, the method includes steps described below.

A first communication node determines CSI-RS indication information;

the first communication node transmits the CSI-RS indication information to a second communication node;

the first communication node transmits or receives a CSI-RS according to the CSI-RS indication information;

where, the CSI-RS indication information includes a number of ports for a CSI-RS resource and information of at least one component;

where, the ports for the CSI-RS resource are used for transmitting the CSI-RS, and the CSI-RS resource is used for carrying the CSI-RS; the component is used for constituting the CSI-RS resource, and the component is a set of resource elements (REs) having relative positional relations.

The present disclosure further provides a CSI-RS transmission method, the method includes steps described below.

A second communication node receives CSI-RS indication information transmitted by a first communication node; and the second communication node transmits or receives a CSI-RS according to the received CSI-RS indication information.

The present disclosure further provides a computer readable storage medium, the computer readable storage medium stores at least one program executable by at least one processor to implement any of the above methods.

The present disclosure further provides a processor for executing at least one program to implement any of the above methods.

The present disclosure provides a CSI-RS transmission device, the device is applied in a first communication node and includes a determination unit, a transmission unit and a reference signal transmission unit.

The determination unit is configured to determine CSI-RS indication information;

the transmission unit is configured to transmit the CSI-RS indication information to a second communication node; and the reference signal transmission unit is configured to transmit or receive a CSI-RS according to the CSI-RS indication information;

where, the CSI-RS indication information comprises a number of ports for a CSI-RS resource and information of at least one component;

where, the ports for the CSI-RS resource are used for transmitting the CSI-RS, and the CSI-RS resource is used for carrying the CSI-RS; the component is used for constituting the CSI-RS resource, and the component is a set of REs having relative positional relations.

The present disclosure further provides a base station, the base station includes any one of the above-mentioned CSI-RS transmission devices.

The present disclosure provides a CSI-RS transmission method, the method includes steps described below. A first communication node determines CSI-RS indication information; the first communication node transmits the CSI-RS indication information to a second communication node; the first communication node transmits or receives a CSI-RS according to the CSI-RS indication information; the CSI-RS indication information includes a number of ports for a CSI-RS resource and information of at least one component; where the ports for the CSI-RS resource are used for transmitting the CSI-RS, and the CSI-RS resource is used for carrying the CSI-RS; the component is used for constituting the CSI-RS resource, and the component is a set of REs having relative positional relations. Through the CSI-RS transmission method, a high-performance CSI-RS transmission is provided, and signaling overheads can be reduced.

Other aspects will become apparent upon reading and understanding drawings and detailed description.

BRIEF DESCRIPTION OF DRAWINGS

Descriptions of drawings of the embodiments will be presented as follows. The drawings in the embodiments are used for further understanding of the present disclosure and together with the description to explain the present disclosure, which will not limit the protection scope of the present disclosure.

FIGS. 4A, 4B, 4C, 4D, 4E, 4F and 4G are schematic diagrams of port multiplexing on a component according to an embodiment of the present disclosure.

DETAILED DESCRIPTION

Figure 1:
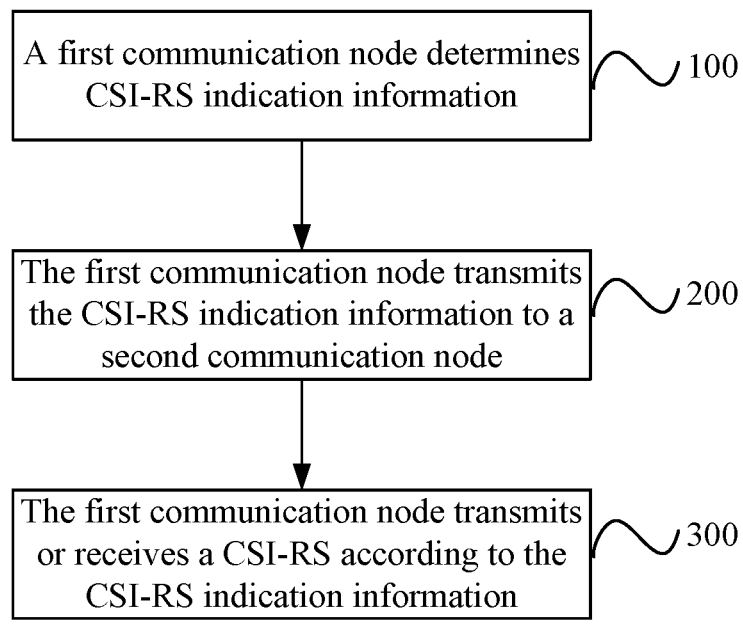
FIG. 1 is a flowchart of a CSI-RS transmission method according to an embodiment of the present disclosure.

Further descriptions of the present disclosure with reference to the accompanying drawings are as below, which are not intended to limit the protection scope of the present disclosure. Referring to FIG. 1, a channel state information reference signal (CSI-RS) transmission method is provided according to an embodiment of the present disclosure, the method includes steps 100, 200 and 300.

In step 100, a first communication node determines CSI-RS indication information.

The CSI-RS indication information includes a number of ports for a CSI-RS resource and information of at least one component.

The ports for the CSI-RS resource are used for transmitting the CSI-RS, and the CSI-RS resource is used for carrying the CSI-RS; the component is used for constituting the CSI-RS resource, and the component is a set of resource elements (REs) having relative positional relations.

In step 200, the first communication node transmits the CSI-RS indication information to a second communication node.

In step 300, the first communication node transmits or receives a CSI-RS according to the CSI-RS indication information.

The CSI-RS transmission method according to an embodiment of the present disclosure will be described below with reference to specific embodiments.

A port represents a logical antenna, and a terminal obtains channel state information on a logical antenna by measuring reference signals on the port; the number of ports represents the number of logical antennas. a component pattern may be expressed by the number Y of successive subcarriers in frequency domain and the number Z of OFDM symbols in time domain, for example, as following component patterns: (Y, Z)=(2, 1), (Y, Z)=(1, 2), (Y, Z)=(4, 1), (Y, Z)=(2, 2), (Y, Z)=(1, 4), (Y, Z)=(8, 1), (Y, Z)=(2, 4), (Y, Z)=(1, 8), and (Y, Z)=(4, 2).

Figure 2:
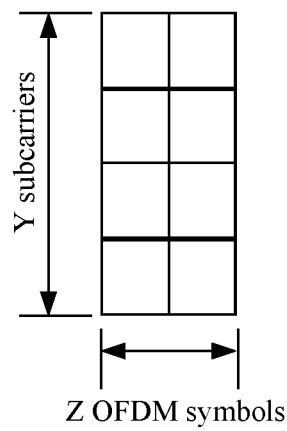
FIG. 2 is a schematic diagram of an exemplary component pattern according to an embodiment of the present disclosure.

FIG. 2 is a schematic diagram of an exemplary component pattern. As shown in FIG. 2, the horizontal axis represents time domain, a square represents an OFDM symbol, the vertical axis represents frequency domain, and a square represents a subcarrier. The component pattern in FIG. 2 is (2, 4).

The base station transmits information about the CSI-RS, and a pattern for the CSI-RS resource and a number of ports may be obtained according to the information. If the terminal obtains this information, it may know on which resource element the base station measures a channel state and of how many ports the base station measures the channel state. The pattern for the CSI-RS resource includes a component pattern, pattern information of the CSI-RS resource may be transmitted through the information of the component.

The pattern for the CSI-RS resource is a set of resource elements (REs), and the component pattern is also a set of REs; the component pattern is just some basic patterns, and the pattern for the CSI-RS resource may be constituted by multiple component patterns.

In an embodiment, the information of the component includes a component pattern and a multiplexing manner of the ports on the component; where the multiplexing manner of the ports on the component has at least one candidate multiplexing manner.

In the step 100 according to an embodiment, the CSI-RS indication information includes the information of the component; the information of the component includes a component pattern, a position of one of the at least one component, and relative positions between the at least one component.

In an embodiment, the step 300 includes a step described below. The transmitter node transmits the CSI-RS according to a number of ports, the information of the component and the multiplexing manner of the ports on the component, after receives the CSI-RS indication information. The transmitter node may be one of the first transmission node or the second transmission node.

In an embodiment, a length of the code division multiplexing performed by the ports may be variable, and a pattern of an RE group used for the code division multiplexing may also have many patterns; the component pattern indicates the multiplexing manner of the ports on the component, which can simplify notification of the specific multiplexing mode.

The ports used for transmitting the CSI-RS by a user, that is, the ports multiplexed on the component are divided into multiple port groups, and REs of the component are divided into multiple RE groups, a one-to-one correspondence exists between the multiple port groups and the multiple RE groups. Ports in each of the multiple port groups are mapped to REs of an RE group corresponding to the each of the multiple port groups of the component in a code division multiplexing manner.

Figure 3A:
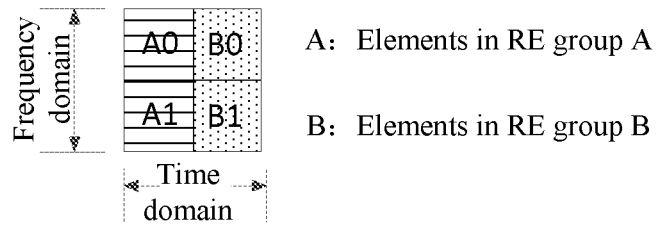
FIGS. 3A and 3B are schematic diagrams of division of resource element groups of a component according to an embodiment of the present disclosure.
Figure 3B:
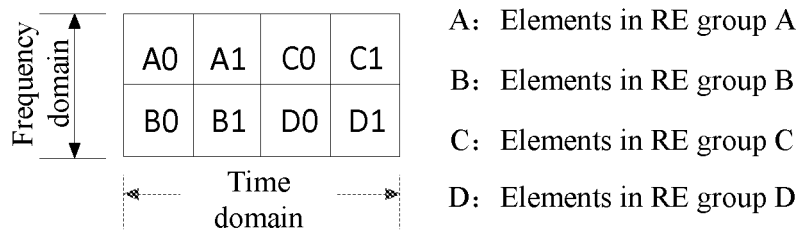

There will be description below with reference to two specific embodiments. FIGS. 3A and 3B are schematic diagrams of division of resource element groups on the component according to an embodiment of the present disclosure.

As shown in FIG. 3A, the multiple RE groups of the component are partitioned in time domain, and the multiple RE groups of the components are successive in time domain; or, as shown in FIG. 3B, the multiple RE groups of the component are partitioned in time-frequency domain, and the multiple RE groups of the component are successive in time-frequency domain.

Ports in a port group are mapped to REs of an RE group corresponding to the port group of the component in the code division multiplexing manner. For example, a RE group includes four REs, port 1 in a certain port group uses the four REs to transmit a CSI-RS, port 2 in the port group also uses the four REs to transmit the CSI-RS, the port 1 and port 2 use the four REs to transmit the CSI-RS in the code division multiplexing manner.

In an embodiment, the RE groups of the component are partitioned in time domain, and the RE groups of the component are successive in time domain. In this way, it can not only ensure that the ports of the component fully use power in the code division multiplexing manner, but also avoid interference of channel estimation introduced by a large span in time domain because of ports of the component using the code division multiplexing manner, that is, not only a full utilization of power is realized in a component level, but also the interference of channel estimation introduced by the large span in time domain of the ports can be avoided.

The multiplexing manner of the ports on the component will be described below with reference to several specific embodiments.

Embodiment 1-1

| | |
|---|---|
| (2, 2) | TDM + FD_CDM2 |

Figure 4A:
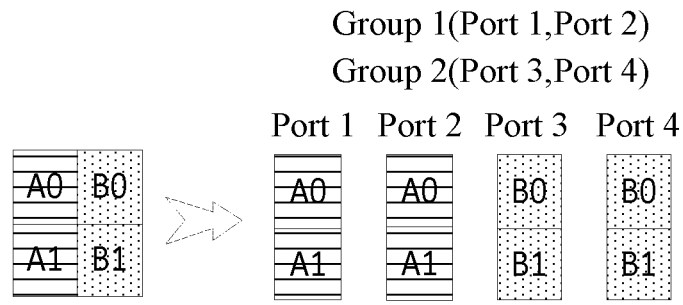

As shown in FIG. 4A, four ports are multiplexed on one component, and the component has four REs, the four REs are divided into two RE groups, the two RE groups are different from each other in time domain, each RE group includes two frequency domain REs, two frequency domain REs of one RE group are the same as two frequency domain REs of the other RE group; one port group uses one RE group, and the other port group uses the other RE group; within a port group, one of two ports in a same port group uses a sequence with a length of 2 to map to two REs of used RE group, and the other port uses another sequence with a length of 2 to map to the two REs of the used RE group; two sequences used by ports of one port group are the same as two sequences used by ports of the other port group.

Embodiment 1-2

| | |
|---|---|
| (1, 4) | TDM + FD_CDM2 |

Figure 4B:
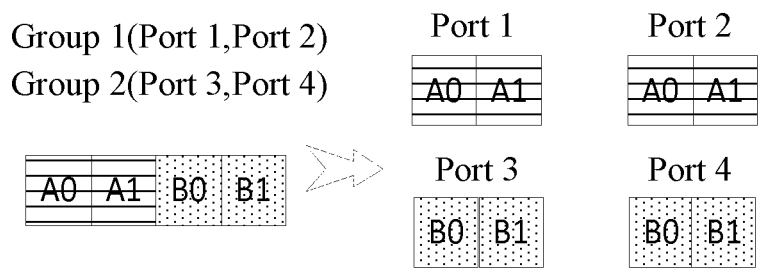

As shown in FIG. 4B, four ports are multiplexed on one component, and the component has four REs in time domain, the four ports are divided into two port groups, each port group has two ports; the four REs are divided into two RE groups, each RE group has two REs, the two RE groups are not staggered in time domain; one port group uses one RE group, and the other port group uses the other RE group; within a port group, one of two ports in a same port group uses a sequence with a length of 2 to map to two REs of used RE group, and the other port uses another sequence with a length of 2 to map to the two REs of the used RE group; the two sequences used by ports of one port group are the same as two sequences used by ports of the other port group.

Embodiment 1-3

| | |
|---|---|
| (2, 4) | TDM + FD_CDM2 |

As shown in FIG. 4C, eight ports are multiplexed on one component, and the component has eight REs, these eight REs are divided into four RE groups, the four RE groups are different from each other in time domain, each RE group has two frequency domain REs, two REs of the each RE group are the same; each port group uses one RE group, and each port group uses a different RE group; within a port group, one of two ports in a port uses a sequence with a length of 2 to map to two REs of used RE group, and the other port uses another sequence with a length of 2 to map to the two REs of the used RE group; two sequences used by ports of the each port group are the same.

Embodiment 1-4

| (2, 4) | TDM + FD_CDM2 |
|---|---|

As shown in FIG. 4D, eight ports are multiplexed on one component, and the component has eight REs, eight ports use these eight REs, the eight REs are divided into four RE groups, the four RE groups are partitioned in two dimensions of time domain and frequency domain, each RE group includes two REs, the two REs are the same in frequency domain but different in time domain; the eight ports are divided into four port groups, each port group has two ports, the each port group uses one RE group; within a port group, one of two ports in a same port uses a sequence with a length of 2 to map to two REs of used RE group, and the other port uses another sequence with a length of 2 to map to the two REs of the used RE group; two sequences used by ports of the each port group are the same.

Embodiment 1-5

| (2, 4) | TDM + FD_CDM4 |
|---|---|

As shown in FIG. 4E, eight ports are multiplexed on one component, and the component has eight REs, the eight REs are divided into two RE groups, the two RE groups are different from each other in time domain, each RE group includes two frequency domain REs and two time domain REs; the eight ports are divided into two port groups, each port group has four ports, each port group uses one RE group, respectively; within a port group, one of two ports in a same port group uses a sequence with a length of 4 to map to four REs, each sequence used by each port of a same port group is different; four sequences used by ports of one port group are the same as four sequences used by ports of the other port group.

Embodiment 1-6

| (4, 2) | FDM-TDM + FD_CDM2 |
|---|---|

As shown in FIG. 4F, eight ports are multiplexed on one component, and the component has eight REs, the eight REs are divided into four RE groups, the four RE groups are partitioned in time domain and frequency domain, each RE group includes two frequency domain REs; the eight ports are divided into four port groups, each port group includes two ports, each port group uses one RE group, respectively; within a port group, one of two ports in a same port group uses a sequence with a length of 2 to map to two REs of used RE group, each port in a same port group uses a different sequence, and the other port uses another sequence with a length of 2 to map to the two REs of the used RE group; two sequences used by ports of the each port group are the same.

Embodiment 1-7

| (4, 2) | TDM + FD_CDM4 |
|---|---|

As shown in FIG. 4G, eight ports are multiplexed on one component, and the component has eight REs, these eight REs are divided into two RE groups, the two RE groups are different in time domain, each RE group includes four frequency domain REs, four REs of one RE group are same as the other four REs of the other RE group; one port group uses one RE group, while the other port group uses the other RE group; within a port group, each port of a same port group uses a sequence with a length of 4 to map to four REs, each sequence used by each port of a same port group is different; four sequences used by ports of one port group are the same as four sequences used by ports of the other port group.

In an embodiment, the information of the component includes a component pattern, the component pattern indicates a multiplexing manner of the ports on the component: the ports are multiplexed on the component in the code division multiplexing manner, the length of the code division multiplexing is equal to a number of REs included in the component.

In the step 100, the information of the component of the CSI-RE indication information includes a component pattern.

The step 300 includes a step described as follows. The transmitter node determines the multiplexing manner of the ports on the component according to the component pattern, and transmits the CSI-RS according to the number of ports, the information of the component and the multiplexing manner of the ports on the component. The transmitter node may be one of the first transmission node or the second transmission node.

In an embodiment, the length of the code division multiplexing preformed by the ports may be variable, and a RE group pattern used for the code division multiplexing may also have many patterns; the component pattern indicates the multiplexing manner of the ports on the component, which can simplify the notification of the specific multiplexing manner.

Some specific embodiments will be described below.

Embodiment 2-1

| (2, 1) | FD_CDM2 |
|---|---|

The component pattern (2, 1) indicates a following port multiplexing manner: two ports jointly use two REs in frequency domain, one of the two ports uses a sequence with a length of 2 to map to the two REs, and the other port uses another sequence with a length of 2 to map to the two REs.

Embodiment 2-2

| (1, 2) | TD_CDM2 |
|---|---|

The component pattern (1, 2) indicates a following port multiplexing manner: two ports jointly use two REs in time domain, one of the two ports uses a sequence with a length of 2 to map to the two REs, and the other port uses another sequence with a length of 2 to map to the two REs.

Embodiment 2-3

| (4, 1) | FD_CDM4 |
|---|---|

The component pattern (4, 1) indicates a following port multiplexing manner: four ports jointly use four REs in frequency domain, each of the four ports uses a sequence with a length of 4 to map to the four REs, and each sequence used by the each of the four ports is different from each other.

Embodiment 2-4

| (2, 2) | (TD + FD)_CDM4 |
|---|---|

The component pattern (2,2) indicates a following port multiplexing manner: four ports jointly use two frequency domain REs and two time domain REs, where each of the four ports uses a sequence with a length of 4 to map to the four REs, and each sequence used by the each of the four ports is different from each other.

Embodiment 2-5

| (1, 4) | TD_CDM4 |
|---|---|

The component pattern (1, 4) indicates a following port multiplexing manner: four ports jointly use four REs in time domain, where each of the four ports uses a sequence with a length of 4 to map to the four REs, and each sequence used by the each of the four ports is different from each other.

Embodiment 2-6

| (8, 1) | FD_CDM8 |
|---|---|

The component pattern (8, 1) indicates a following port multiplexing manner: eight ports jointly use eight REs in frequency domain, where each of the eight ports uses a sequence with a length of 8 to map to the eight REs, and each sequence used by the each of the eight ports is different from each other.

Embodiment 2-7

| (2, 4) | FD_TD_CDM8 |
|---|---|

The component pattern (2, 4) indicates a following port multiplexing manner: eight ports use eight REs, each of the eight ports uses a sequence with a length of 8 to map to the eight REs, and each sequence used by the each of the eight ports is different from each other.

Embodiment 2-8

| (4, 2) | FD_TD_CDM8 |
|---|---|

The component pattern (4, 2) indicates a following port multiplexing manner: eight ports use eight REs; the eight REs are divided into two RE groups, the two RE groups are different from each other in frequency domain, and each RE group includes four frequency domain REs, four frequency domain REs of one RE group are the same as four frequency domain REs of the other RE group; each port uses a sequence with a length of 8 to map to the eight REs, and each sequence used by the each port is different from each other.

In an embodiment, the information of the component includes a component pattern and the length of code division multiplexing of the ports; the component pattern and the length of the code division multiplexing jointly indicate a multiplexing manner of the ports on the component.

In the step 100, the information of the component of the CSI-RS indication information includes a component pattern and the length of code division multiplexing of the ports.

The step 300 includes steps described as follows. The transmitter node determines the multiplexing manner of the ports on the component according to the component pattern and the length of the code division multiplexing included in the CSI-RS indication information, and transmits the CSI-RS according to the number of ports, the information of the component and the multiplexing manner of the ports on the component. The transmitter node may be one of the first communication node or the second communication node.

It should be noted that, since there are many multiplexing manners of the ports on the component, the component pattern and the length of the code division multiplexing of the ports may jointly indicate the multiplexing manner of the ports on the component, which can simplify the notification the multiplexing manner of the ports, signaling overheads can be reduced and power is fully used. For components with a same number of REs, the multiplexing manner of the ports can be controlled by two different parameters; or, for CSI-RS resources with a same number of ports, the multiplexing manner of the ports can be controlled by two different parameters; thus flexibility of the multiplexing manner of the ports controlled by a signaling can be provided.

Some specific embodiments will be described below.

Embodiment 3-1

| (4, 1) | FDM + FD_CDM2 |
|---|---|

The component pattern (4,1) and the length of the code division multiplexing of 2 jointly indicate a following port multiplexing manner: four ports use four REs in frequency domain; the four ports are divided into two port groups, each port group includes two ports; the four frequency domain REs are divided into two RE groups, each RE group includes two REs, and the two RE groups are not staggered in frequency domain; one port group uses one frequency domain RE group, and the other port group uses the other frequency domain RE group; within a port group, one of two ports of a same port group uses a sequence with a length of 2 to map to two REs of used RE group, and the other port uses another sequence with a length of 2 to map to the two REs of the used RE group; two sequences used by ports of one port group are the same as two sequences used by ports of the other port group. A same port group has a same beam, and different port groups have their own independent beams, CSI of multiple ports may be measured while scanning beams.

Embodiment 3-2

| (2, 2) | TDM + FD_CDM2 |
|---|---|

The component pattern (2,2) and the length of the code division multiplexing of 2 jointly indicate a following port multiplexing manner: four ports use four REs; the four ports are divided into two port groups, while the four REs are divided into two RE groups, the two RE groups are different from each other in time domain, and each RE group includes two frequency domain REs; two frequency domain REs of one RE group are the same as two frequency domain REs of the other RE group; one port group uses one frequency domain RE group, and the other port group uses the other frequency domain RE group; within a port group, one of two ports of a same port group uses a sequence with a length of 2 to map to two REs of used RE group, and the other port uses another sequence with a length of 2 to map to the two REs of the used RE group; two sequences used by port of one port group are the same as two sequences used by ports of the other port group.

Embodiment 3-3

| (2, 2) | FDM_TD_CDM2 |
|---|---|

The component pattern (2, 2) and the length of the code division multiplexing of 2 jointly indicate a following port multiplexing manner: four ports use four REs; the four REs are divided into two RE groups, the two RE groups are different from each other in frequency domain, and each RE group includes two time domain REs; two time domain REs of one RE group are the same as two time domain REs of the other RE group; one port group uses one RE group, and the other port group uses the other RE group; within a port group, one of two ports of a same port group uses a sequence with a length of 2 to map to two REs of used RE group, and the other port uses another sequence with a length of 2 to map to the two REs of the used RE group; two sequences used by ports of one port group are the same as two sequences used by ports of the other port group.

Embodiment 3-4

| (1, 4) | TDM + TD_CDM2 |
|---|---|

The component pattern (1,4) and the length of the code division multiplexing of 2 jointly indicate a following port multiplexing manner: four ports use four REs in time domain; the four ports are divided into two port groups, each port group includes two ports, and the four REs are divided into two RE groups, and each RE group includes two REs, the two RE groups are not staggered in time domain; one port group uses one time domain RE group, and the other port group uses another time domain RE group; within a port group, one of two ports of a same port group uses a sequence with a length of 2 to map to two REs of used RE group, and the other port uses another sequence with a length of 2 to map to the two REs of the used RE group; two sequences used by ports of one port group are the same as two sequences used by ports of the other port group.

Embodiment 3-5

| (8, 1) | FDM + FD_CDM2 |
|---|---|

The component pattern (8,1) and the length of the code division multiplexing of 2 jointly indicate a following port multiplexing manner: eight ports use eight REs in frequency domain; the eight ports are divided into four port groups, each port group includes two ports, while the eight REs are divided into four RE groups, and each RE group includes two REs, the four RE groups are not staggered in frequency domain; one port group uses one frequency domain RE group, each port group uses a different frequency domain RE group; within a port group, one of two ports of a same port group uses a sequence with a length of 2 to map to two REs of used RE group, and the other port uses another sequence with a length of 2 to map to the two REs of the used RE group; two sequences used by ports of one port group are the same as two sequences used by ports of the other port group.

Embodiment 3-6

| (8, 1) | FDM + FD_CDM4 |
|---|---|

The component pattern (8,1) and the length of the code division multiplexing of 4 jointly indicate a following port multiplexing manner: eight ports use eight REs in frequency domain; the eight ports are divided into two port groups, each port group includes four ports, while the eight REs are divided into two RE groups, and each RE group includes four REs, the two RE groups are not staggered in frequency domain; one port group uses one frequency domain RE group, each port group uses a different frequency domain RE group; within a port group, each port of a same port group uses a sequence with a length of 4 to map to four REs of used RE group, each sequence used by the each port is different; four sequences used by ports of the each port group are the same as four sequences used by ports of the other port group.

Embodiment 3-7

| (2, 4) | TDM + FD_CDM2 |
|---|---|

The component pattern (2,4) and the length of the code division multiplexing of 2 jointly indicate a following port multiplexing manner: eight ports use eight REs; the eight REs are divided into four RE groups, the four RE groups are different from each other in time domain, and each RE group includes two frequency domain REs, two frequency domain REs of one RE group are the same as two frequency domain REs of another RE group; one port group uses one frequency domain RE group, each port group uses a different frequency domain RE group; within a port group, one of two ports of a same port group uses a sequence with a length of 2 to map to two REs of used RE group, and the other port uses another sequence with a length of 2 to map to the two REs of the used RE group; the each port group uses same two sequences.

Embodiment 3-8

| (2, 4) | FDM + TDM + TD_CDM2 |
|---|---|

The component pattern (2,4) and the length of the code division multiplexing of 2 jointly indicate a following port multiplexing manner: eight ports use eight REs; the eight REs are divided into four RE groups, the four RE groups are different from each other in time domain, and each RE group includes two frequency domain REs, two frequency domain REs of one RE group are the same as two frequency domain REs of another RE group; two REs used by each port group are same in frequency domain and different (successive) in time domain, and the two REs used by the each port group are not staggered in time domain and not overlapped; within a port group, one of two ports of a same port group uses a sequence with a length of 2 to map to two REs of used RE group, and the other port uses another sequence with a length of 2 to map to the two REs of the used RE group; the each port group uses same two sequences.

Embodiment 3-9

| (2, 4) | TDM + FD_TD_CDM4 |
|---|---|

The component pattern (2,4) and the length of the code division multiplexing of 4 jointly indicate a following port multiplexing manner: eight ports use eight REs; the eight REs are divided into four RE groups, the four RE groups are different from each other in time domain, and each RE group includes two frequency domain REs, two frequency domain REs of one RE group are the same as two frequency domain REs of another RE group; each port group uses two REs in frequency domain and two REs in time domain, and these four REs used in each port group are not overlapped in time domain; within a port group, each port of a same port group uses a sequence with a length of 4 to map to four REs, each sequence used by the each port is different from each other; the each port group uses same four sequences.

Embodiment 3-10

| (2, 4) | FDM + TD_CDM4 |
|---|---|

The component pattern (2,4) and the length of the code division multiplexing of 4 jointly indicate a following port multiplexing manner: eight ports use eight REs; these eight REs are divided into two RE groups, the two RE groups are different from each other in frequency domain, and each RE group includes four frequency domain REs, four frequency domain REs of one RE group are the same as four frequency domain REs of the other RE group; one port group uses one RE group, the other port group uses the other RE group; within a port group, each port of a same port group uses a sequence with a length of 4 to map to four REs, each sequence used by the each port is different from each other; the each port group uses same four sequences.

Embodiment 3-11

| (4, 2) | FDM-TDM + FD_CDM2 |
|---|---|

The component pattern (4,2) and the length of the code division multiplexing of 2 jointly indicate a following port multiplexing manner: eight ports use eight REs; the eight REs are divided into four RE groups, the four RE groups are different from each other in frequency domain, and each RE group includes two time domain REs, two time domain REs of one RE group are the same as two time domain REs of another RE group; each port group uses two REs, the two REs are different in frequency domain and the same in time domain, and two REs used by the each port group are not staggered in frequency domain; within a port group, each port of a same port group uses a sequence with a length of 2 to map to two REs of used RE group, the other port uses the other sequence with a length of 2 to map to the two REs of the used RE group; the each port group uses same two sequences.

Embodiment 3-12

| (4, 2) | FDM + TD_CDM2 |
|---|---|

The component pattern (4,2) and the length of the code division multiplexing of 2 jointly indicate a following port multiplexing manner: eight ports use eight REs; the eight REs are divided into four RE groups, the four RE groups are different from each other in frequency domain, and each RE group includes two time domain REs, two time domain REs of one RE group are the same as two time domain REs of another RE group; each port group uses one of the four RE groups, REs used by each port group are different; within a port group, each port of a same port group uses a sequence with a length of 2 to map to two REs of used RE group, the other port uses the other sequence with a length of 2 to map to the two REs of the used RE group; the each port group uses same two sequences.

Embodiment 3-13

| (4, 2) | TDM + FD_CDM4 |
|---|---|

The component pattern (4,2) and the length of the code division multiplexing of 4 jointly indicate a following port multiplexing manner: eight ports use eight REs; these eight REs are divided into two RE groups, the two RE groups are different from each other in time domain, and each RE group includes four frequency domain REs, four frequency domain REs of one RE group are the same as four frequency domain REs of the other RE group; one port group uses one RE group, the other port group uses the other RE group; within a port group, each port in a same port group uses a sequence with a length of 4 to map to four REs of used RE group, each sequence used by the each port is different from each other; the each port group uses same four sequences.

Embodiment 3-14

| | |
|---|---|
| (4, 2) | FDM + FD_TD_CDM4 |

The component pattern (4,2) and the length of the code division multiplexing of 4 jointly indicate a following port multiplexing manner: eight ports use eight REs; the eight REs are divided into four RE groups, the four RE groups are different from each other in frequency domain, and each RE group includes two time domain REs, two time domain REs of one RE group are the same as two time domain REs of another RE group; each port group uses two REs in time domain and two REs in frequency domain, and these four REs used by the each port group are not overlapped in frequency domain; within a port group, each port in a same port group uses a sequence with a length of 4 to map to four REs of used RE group, each sequence used by the each port in a port group is different from each other; the each port group uses same four sequences.

In an embodiment, the information of the component includes a component pattern and a multiplexing manner of the ports on the component; the information of the component further includes at least one of followings:

a beam attribute of the component, a quasi-co-location attribute of the component, a polarization attribute of the component, a phase tracking attribute of the component, a synchronization attribute of the component, a beam attribute of a port group on the component, a quasi-co-location attribute of the port group on the component, a polarization attribute of the port group on the component, a phase tracking attribute of the port group on the component, or a synchronization attribute of the port group on the component.

It should be noted that, the component may be used to distinguish beams, i.e. ports on a same component use a same beam; the component may be used to distinguish transmission positions of reference signals, i.e. ports on a same component use a same transmission position; the component may be used to distinguish a polarization attribute of an antenna port, i.e. ports on a same component belong to a same polarization direction; the component may be used to distinguish a phase, i.e. ports on a same component have a same phase change; the component may be used to distinguish synchronization, i.e. ports on a same component have a same synchronization state.

Port groups on the component may be used to distinguish beams, i.e. ports of a port group on a same component use a same beam; port groups on the component may be used to distinguish a transmission position of a reference signal, i.e. ports of a port group on a same component use a same transmission position; port groups on the component may be used to distinguish the polarization attribute of an antenna port, i.e. ports of a port group on a same component belong to a same polarization direction; port groups on the component may be used to distinguish phases, i.e. ports of a port group on a same component have a same phase change; port groups on the component may be used to distinguish synchronization, i.e. ports of a port group on a same component have a same synchronization state.

For example, these attributes may be indicated to be enabled or not enabled; types of these attributes are indicated; these attributes are indicated or displayed; these attributes are implicitly indicated; these attributes are individually indicated; or these attributes are indicated in a combination encoding manner.

In an embodiment, the information of the component includes a component pattern; the CRI-RS resource includes at least one component, the multiple components has a same component pattern; CSI-RS resources with different numbers of ports have independent candidate component pattern sets; the first communication node uses same CSI-RS indication information to configure the component pattern for each of the CSI-RS resources with different numbers of ports.

In an embodiment according to the present disclosure, the first communication node as the base station, and the second communication node as the terminal are taken as an example.

The base station configures corresponding component pattern sets for a CSI-RS resource with a number X of the ports, CSI-RS resources with different X values correspond to own candidate component pattern sets, respectively, the candidate component pattern sets are independent from each other, and the base station uses same component pattern set indication information to indicate patterns in the candidate component pattern sets with different X values.

For example, the first communication node transmits the component pattern set indication information to the second communication node; the transmitter node obtains a component pattern set corresponding to the number X of the ports according to the number X of the ports and the component pattern set indication information; and acquires the multiplexing manner of the ports on the component according to the component pattern set; moreover, transmits the CSI-RS according to the multiplexing manner of the ports on the component. The transmitter node may be one of the first communication node or the second communication node.

Independence of the multiple candidate component pattern sets means that components among these multiple candidate component pattern sets may be the same or different.

There will be description below with a specific embodiment.

TABLE 1

Correspondence between number X of ports and component pattern set

| X | component pattern 1 | component pattern 2 |
|---|---|---|
| 2 | (Y, Z) = (2, 1) | None |
| 4 | (Y, Z) = (4, 1) | (Y, Z) = (2, 2) |
| 8 | (Y, Z) = (8, 1) | (Y, Z) = (2, 2) |
| 16 | (Y, Z) = (8, 2) | (Y, Z) = (2, 4) |
| 32 | (Y, Z) = (8, 2) | None |

Table 1 shows an exemplary correspondence between the number X of ports and a component pattern set, in this embodiment, when the number X of the ports is 2, one component pattern is included in a component pattern set corresponding to the number X of the ports. When the number X of ports is 4, the corresponding component pattern set includes two component patterns, namely (4,1) and (2,2).

Further Examples

TABLE 2

Correspondence between number X of ports and component pattern set

| X | component pattern 1 | component pattern 2 |
|---|---|---|
| 2 | (Y, Z) = (2, 1) | None |
| 4 | (Y, Z) = (4, 1) | (Y, Z) = (2, 2) |
| 8 | (Y, Z) = (8, 1) | (Y, Z) = (4, 2) |
| 16 | (Y, Z) = (8, 2) | (Y, Z) = (4, 2) |
| 32 | (Y, Z) = (8, 2) | None |

As shown in table 2, another exemplary correspondence between the number X of ports and component pattern set is provided.

In an embodiment, the information of the component includes a component pattern, the component pattern indicates relative positions between the at least one component.

In an embodiment, the information of the component includes a component pattern and a multiplexing manner of the ports on the component; where a set of candidate multiplexing manners of the ports on the component is determined according to the component pattern.

In an embodiment, the information of the component includes a component pattern and a multiplexing manner of the ports on the component; where a set of candidate multiplexing manners of the ports on the component is determined according to the number of ports for the CSI-RS resource and the component pattern.

It should be noted that the component pattern usually has a position in two dimensions, time domain and frequency domain, and there are two dimensions of the relative positions between the at least one component, namely, time domain and frequency domain. Selection of a special component pattern may enable an aggregation of a CSI-RS resource only at a certain relative position to achieve a required CSI-RS resource pattern, thus the relative positions between components are indicated by the component pattern, so that notification of the relative positions between the components is simplified, furthermore complexity of transmitting the CSI-RS is reduced due to reduction of changes of relative positions among various components.

For example, a component pattern (Y,Z)=(2,2) indicates that components participating in an aggregation of a CSI-RS resource are located on same two OFDM symbols; a component pattern (Y,Z)=(2,4) indicates that components participating in an aggregation of a CSI-RS resource are located on same two OFDM symbols; a component pattern (Y,Z)=(8,2) indicates that components participating in an aggregation of a CSI-RS resource are at a same subcarrier position. The following will be described with reference to table 3.

TABLE 3

Correspondence between number X of ports and relative positions between components

| X | component pattern 1 | component pattern 2 |
|---|---|---|
| 2 | (Y, Z) = (2, 1) | None |
| 4 | (Y, Z) = (4, 1) | (Y, Z) = (2, 2) |
| 8 | (Y, Z) = (8, 1) | Two (Y, Z) = (2, 2) are aggregated on a same OFDM symbol |
| 16 | One (Y, Z) = (8, 2) | Two (Y, Z) = (2, 4) are aggregated on a same OFDM symbol |
| 32 | Two (Y, Z) = (8, 2) are aggregated on a same frequency position | None |

Table 3 shows a correspondence between the number X of ports and relative positions between components. In this embodiment, when the number X of ports is 2, a component pattern of (2, 1) is included in a component pattern set corresponding to the number X of ports. When the number X of ports is 4, the corresponding component pattern set includes two component patterns, namely (4, 1) and (2, 2).

Another embodiment is given as below.

TABLE 4

Correspondence between number X of ports and relative positions between components

| X | component pattern 1 | component pattern 2 |
|---|---|---|
| 16 | One (Y, Z) = (8, 2) | Two (Y, Z) = (4, 2) are aggregated on a same frequency position |
| 32 | Two (Y, Z) = (8, 2) are aggregated on a same frequency position | None |

Table 4 shows another embodiment of a correspondence between the number X of ports and relative positions between components.

In an embodiment, the information of the component includes a component pattern, where the component pattern indicates a multiplexing manner of the ports on the component.

In the step 100, the information of the component in the CSI-RS indication information includes a component pattern and a length of code division multiplexing of the ports.

The step 300 includes steps described as follows. The first transmission node determines the multiplexing manner of the ports on the component according to the component pattern, and transmits the CSI-RS according to the number of ports, the information of the component and the multiplexing manner of the ports on the component. The transmitter node may be one of the first communication node or the second communication node.

Specific embodiments will be described below.

TABLE 5

Correspondence between component pattern and multiplexing manner of the ports on the component

| component pattern of (Y, Z) participating in aggregation | Set of candidate multiplexing manners for ports |
|---|---|
| (Y, Z) = (2, 1) | {Without CDM} |
| (Y, Z) = (4, 1) | {Without CDM} |
| (Y, Z) = (2, 2) | {Without CDM, CDM-2 in time domain} |
| (Y, Z) = (8, 1) | {Without CDM, CDM-2 in frequency domain} |
| (Y, Z) = (8, 2) | {Without CDM, CDM-2 in frequency domain, CDM-4 in time-frequency domain} |
| (Y, Z) = (2, 4) | {Without CDM, CDM-2 in time domain, CDM-4 in time domain} |

TABLE 5-continued

Correspondence between component pattern and multiplexing manner of the ports on the component

| component pattern of (Y, Z) participating in aggregation | Set of candidate multiplexing manners for ports |
|---|---|
| (Y, Z) = (8, 2) | {Without CDM, CDM-2 in frequency domain, CDM-4 in time-frequency domain, CDM-8 in time-frequency domain} |
| (Y, Z) = (4, 4) | {Without CDM, CDM-2 in frequency domain, CDM-4 in frequency domain, CDM-4 in time-frequency domain, CDM-8 in time-frequency domain} |

Table 5 shows an exemplary of a correspondence between the component pattern and the multiplexing manner of the ports on the component, in this embodiment, when the component pattern is (2, 1), the multiplexing manner of ports on the component corresponding to the component pattern is "{without CDM}".

For the (Y, Z), Y represents a number of successive subcarriers occupied by the component pattern, and Z represents a number of successive OFDM symbols occupied by the component pattern.

Without CDM means that ports multiplexed on the component do not use the code division multiplexing manner, CDM-N means that ports multiplexed on the component are divided into at least one group, REs of the component are also divided into at least one group, a one-to-one correspondence exists between the at least one port group and the at least RE group, ports in each of multiple port groups are mapped to REs of an RE group corresponding to the each of the multiple port groups of the component in the code division multiplexing manner with a length of N; CDM in time domain represents that the multiple RE groups of the component are partitioned in time domain, CDM in frequency domain represents that the multiple RE groups of the component are partitioned in frequency domain, and CDM in time-frequency domain represents that the multiple RE groups of the component are partitioned in time-frequency domain.

In an embodiment, the information of the component includes a component pattern. The component pattern and the number of ports jointly indicate a multiplexing manner of the ports on the component.

In the step 100, the information of the component in the CSI-RS indication information includes a component pattern.

The step 300 includes steps described as follows. The transmitter node determines the multiplexing manner of the ports on the component according to the component pattern and the number of ports in the CSI-RS indication information, and transmits the CSI-RS according to the number of ports, the information of the component and the multiplexing manner of the ports on the component. The transmitter node may be one of the first communication node or the second communication node.

Specific embodiments will be described below.

TABLE 6

Correspondence between number of ports, component pattern and multiplexing manner of the ports on the component

| Number of ports for CSI-RS resource | component pattern of (Y, Z) participating in aggregation | Set of candidate multiplexing manners of ports |
|---|---|---|
| 2 | (Y, Z) = (2, 1) | {Without CDM} |
| 4 | (Y, Z) = (4, 1) | {Without CDM} |
|   | (Y, Z) = (2, 2) | {Without CDM, CDM-2 in time domain} |
| 8 | (Y, Z) = (8, 1) | {Without CDM, CDM-2 in frequency domain} |
|   | (Y, Z) = (2, 2) | {Without CDM, CDM-2 in time domain} |
| 16 | (Y, Z) = (8, 2) | {Without CDM, CDM-2 in frequency domain, CDM-4 in time-frequency domain} |
|   | (Y, Z) = (2, 4) | {Without CDM, CDM-2 in time domain, CDM-4 in time domain} |
| 32 | (Y, Z) = (8, 2) | {Without CDM, CDM-2 in frequency domain, CDM-4 in time-frequency domain, CDM-8 in time-frequency domain} |
|   | (Y, Z) = (4,4) | {Without CDM, CDM-2 in frequency domain, CDM-4 in frequency domain, CDM-4 in time-frequency domain, CDM-8 in time-frequency domain} |

Table 6 shows an example of a correspondence between the number of ports, component pattern and multiplexing manner of the ports on the component, in this embodiment, when the number X of ports is 2 and the component pattern is (2,1), the multiplexing manner of ports on the component corresponding to the number X of ports and the component pattern is {without CDM}.

For (Y, Z), Y represents a number of successive subcarriers occupied by the component pattern, and Z represents a number of successive OFDM symbols occupied by the component pattern.

Without CDM means that ports multiplexed on the component do not use the code division multiplexing manner, CDM-N means that ports multiplexed on the component are divided into at least one group, REs of the components are also divided into one or more groups, a one-to-one correspondence exists between the at least one port group and the at least RE group, ports in each of the multiple port groups are mapped to REs of an RE group corresponding to the each of the multiple port groups of the component in the code division multiplexing manner with a length of N; CDM in time domain represents that the multiple RE groups of the component are partitioned in time domain, CDM in frequency domain represents that the multiple RE groups of the component are partitioned in frequency domain, and CDM in time-frequency domain represents that the multiple RE groups of the component are partitioned in time-frequency domain.

TABLE 7

Correspondence between the number of the ports, component pattern and multiplexing manner of the ports on the component

| Number of ports for CSI-RS resource | component pattern of (Y, Z) participating in aggregation | Set of candidate multiplexing manners of ports |
|---|---|---|
| 2 | (Y, Z) = (2, 1) | {Without CDM} |
| 4 | (Y, Z) = (4, 1) | {Without CDM} |
|  | (Y, Z) = (2, 2) | {Without CDM, CDM-2 in time domain} |
| 8 | (Y, Z) = (8, 1) | {Without CDM, CDM-2 in frequency domain} |
|  | (Y, Z) = (2, 2) | {Without CDM, CDM-2 in time domain} |
| 16 | (Y, Z) = (8, 2) | {Without CDM, CDM-2 in frequency domain, CDM-4 in time-frequency domain} |
|  | (Y, Z) = (4,2) | {Without CDM, CDM-2 in frequency domain, CDM-4 in time-frequency domain} |
| 32 | (Y, Z) = (8, 2) | {Without CDM, CDM-2 in frequency domain, CDM-4 in time-frequency domain, CDM-8 in time-frequency domain} |
|  | (Y, Z) = (4, 2) | {Without CDM, CDM-2 in time domain, CDM-4 in time domain, CDM-3 in time-frequency domain} |

Table 7 shows another exemplary correspondence between the number of ports, component pattern, and multiplexing manner of the ports on the component.

In an embodiment according to the present disclosure, the CSI-RS indication information further includes at least a multiplexing manner of the ports on the component; the information of the component includes a component pattern, a position of one of the at least one component, and relative positions between the at least one component.

In an embodiment according to the present disclosure, the CSI-RS indication information is configured in a following signaling manner:

the CSI-RS indication information is configured by a radio resource control (RRC) signaling, and one of following information is indicated by a downlink control information (DCI) signaling or a media access control control element (MAC CE) signaling:

not transmitting the CSI-RS, or transmitting the CSI-RS in a zero power manner;

an updated position of the component or an updated position of the CSI-RS resource; and transmitting the CSI-RS normally.

In an embodiment according to the present disclosure, the CSI-RS indication information is configured in a following signaling manner:

a number of ports for the resource, a component pattern, a position of one of the at least one component and the relative positions between the at least one component are configured by an RRC signaling; and the multiplexing manner of the ports on the at least one component is configured an MAC CE signaling.

In an embodiment according to the present disclosure, the CSI-RS indication information is configured in a following signaling manner:

a number of ports for the CSI-RS resource, a component pattern and the multiplexing manner of the ports on the at least one component are configured by an RRC signaling; and the position of one of the at least one component and the relative positions between the at least one component are configured by an MAC CE signaling; or a position of the CSI-RS resource is configured by the MAC CE signaling.

In an embodiment according to the present disclosure, the CSI-RS indication information further includes an identification number of the CSI-RS resource, where a CSI-RS sequence is generated by a pseudo-random sequence, the pseudo-random sequence is initialized by the identification number of the CSI-RS resource; the identification number of the CSI-RS resource is an identification number of a resource carrying the CSI-RS or an identification number of a resource carrying CSI-RS other than the CSI-RS.

In an embodiment according to the present disclosure, the CSI-RS indication information further includes a beam identification number; where a CSI-RS sequence is generated by a pseudo-random sequence, the pseudo-random sequence is initialized by the beam identification number.

In an embodiment according to the present disclosure, each component corresponds to a beam identification number, and a pseudo-random sequence corresponding to the each component is initialized by the beam identification number corresponding to the each component; or each port group corresponds to a beam identification number, and a pseudo-random sequence corresponding to the each port group is initialized by the beam identification number corresponding to the each port group.

In an embodiment according to the present disclosure, the CSI-RS indication information further includes a quasi-co-location identification (QCL) number, where a CSI-RS sequence is generated by the QCL identification number.

It should be noted that, using the resource identification number to generate the CSI-RS sequence can reduce interference between different resources; using the beam identification number to generate the CSI-RS sequence can reduce interference between different beams; and using the QCL identification number to generate the CSI-RS sequence can reduce interference between different transmission positions.

In an embodiment according to the present disclosure, when the CSI-RS and a phase tracking reference signal are transmitted on a same RE, the CSI-RS is transmitted in a zero power manner on a RE corresponding to the CSI-RS, or the CSI-RS is not transmitted;

when the CSI-RS and a data demodulation reference signal are transmitted on a same RE, the CSI-RS is transmitted in the zero power manner on a RE corresponding to the CSI-RS, or the CSI-RS is not transmitted.

In an embodiment according to the present disclosure, when the CSI-RS and a phase tracking reference signal are transmitted on a same RE, the phase tracking reference signal is transmitted in a zero power manner on a RE corresponding to the CSI-RS, or the phase tracking reference signal is not transmitted.

The CSI-RS is a zero power CSI-RS or a non-zero power CSI-RS.

In an embodiment according to the present disclosure, when the CSI-RS and a phase tracking reference signal are transmitted on a same RE, one of the CSI-RS or the phase tracking reference signal is determined to be transmitted in a zero power manner on a RE corresponding to the one of the CSI-RS or the phase tracking reference signal according to a rule configured by the first communication node; or one of the CSI-RS or the phase tracking reference signal is not transmitted on the RE corresponding to the one of the CSI-RS or the phase tracking reference signal.

The CSI-RS is a zero power CSI-RS or a non-zero power CSI-RS.

The phase tracking reference signal is a zero power phase tracking reference signal or a non-zero power phase tracking reference signal.

In an embodiment according to the present disclosure, the CSI-RS resource with a number X of ports includes multiple components, and relative positions between the components are determined by a value of X, where a method for determining the relative positions between the components comprises one of followings:

when X={8,16}, it is determined that the components are combined on a same orthogonal frequency division multiplexing (OFDM) symbol; and when X=32, it is determined that the components are combined on a same subcarrier.

In an embodiment according to the present disclosure, the CSI-RS further has a quasi-co-location attribute, and the quasi-co-location attribute has two of following candidate types:

type 1: ports in a CSI-RS resource are quasi-co-location;
type 2: ports in a component are quasi-co-location;
type 3: ports in a code division multiplexing group are quasi-co-location;
type 4: ports in a CSI-RS resource set are quasi-co-location; and
type 5: ports in a CSI-RS resource are not quasi-co-location.

The quasi-co-location ports are considered to transmit the CSI-RS at a same position.

It should be noted that, the quasi-co-location attribute between ports of the CSI-RS is beneficial to improve performance of channel estimation.

For example, candidate types of the quasi-co-location attribute may include one of followings: {type 1, type 2, type 3, type 4, type 5}, {type 2, type 3, type 4, type 5}, {type 1, type 2, type 3}, {type 2, type 3} or {type 3, type 4}.

In an embodiment according to the present disclosure, the first communication node selects one of the candidate types of the quasi-co-location attribute for configuration.

In an embodiment according to the present disclosure, the CSI-RS further has a function attribute, and a type of the function attribute of the CSI-RS is a quasi-co-location attribute type determined from the candidate types of the quasi-co-location attribute.

In an embodiment according to the present disclosure, the CSI-RS has a following type of a quasi-co-location attribute:

ports in a component are quasi-co-location;
where the quasi-co-location ports are considered to transmit the CSI-RS at a same position.

In an embodiment according to the present disclosure, the CSI-RS has a following type of a quasi-co-location attribute:

ports in a code division multiplexing group are quasi-co-location;
where the quasi-co-location ports are considered to transmit the CSI-RS at a same position.

Based on the same or similar concepts as the above embodiments, the embodiments of the present disclosure further provide a channel state information reference signal transmission device, which is arranged on a first communication node. The channel state information reference signal transmission device includes a determination unit, a transmission unit and a reference signal transmission unit.

The determination unit is configured to determine CSI-RS indication information;

the transmission unit is configured to transmit the CSI-RS indication information to a second communication node; and the reference signal transmission unit is configured to transmit or receive a CSI-RS according to the CSI-RS indication information.

The CSI-RS indication information comprises a number of ports for a CSI-RS resource and information of at least one component.

The ports of the channel state information reference signal resource are used for transmitting the channel state information reference signal, and the channel state information reference signal resource is used for carrying the channel state information reference signal; the components are used for constituting the channel state information reference signal resource, and the components are a set of REs with position correlations.

In an embodiment according to the present disclosure, the information of the component comprises a component pattern and a multiplexing manner of the ports on the component; the multiplexing manner of the ports on the component has at least one candidate multiplexing manner, the ports multiplexed on the component are divided into multiple port groups, and REs of the component are divided into multiple RE groups, a one-to-one correspondence exists between the multiple port groups and the multiple RE groups, and ports in each of the plurality of port groups are mapped to REs of an RE group corresponding to the each of the multiple ort groups of the component in a code division multiplexing manner;

the multiple RE groups of the component is partitioned in time domain, and the multiple RE groups of the components is successive in time domain; or the multiple RE groups of the component is partitioned in time-frequency domain, and the multiple E groups of the component is successive in time-frequency domain.

In an embodiment according to the present disclosure, the information of the component includes a component pattern, the component pattern indicates that the ports are multiplexed on the component in a following manner: the ports are multiplexed on the component in a code division multiplexing manner, where a length of the code division multiplexing is equal to a number of REs included in the component.

In an embodiment according to the present disclosure, the information of the component includes a component pattern and a length of code division multiplexing of the ports; the component pattern and the length of the code division multiplexing jointly indicate a multiplexing manner of the ports on the component.

In an embodiment according to the present disclosure, the information of the component includes a component pattern and a multiplexing manner of the ports on the component; the information of the components further includes at least one of followings:

a beam attribute of the component, a quasi-co-location attribute of the component, a polarization attribute of the component, a phase tracking attribute of the component, a synchronization attribute of the component, a beam attribute of a port group on the component, a quasi-co-location attribute of the port group on the component, a polarization attribute of the port group on the component, a phase tracking attribute of the port group on the component, or a synchronization attribute of the port group on the component.

In an embodiment according to the present disclosure, the information of the component includes a component pattern; the CRI-RS resource includes at least one component, and when the CRI-RS resource includes multiple components, the multiple components has a same component pattern;

CSI-RS resources with different numbers of ports have independent candidate component pattern sets; the first communication node uses same CSI-RS indication information to configure the component pattern for each of the CSI-RS resources with different numbers of ports.

In an embodiment according to the present disclosure, the information of the component includes a component pattern; the component pattern indicates relative positions between the at least one component.

In an embodiment according to the present disclosure, the information of the component includes a component pattern and a multiplexing manner of the ports on the component; where a set of candidate multiplexing manners of the ports on the component is determined according to the component pattern.

In an embodiment according to the present disclosure, the information of the component includes a component pattern and a multiplexing manner of the ports on the component; where a set of candidate multiplexing manners of the ports on the component is determined according to the number of ports for the CSI-RS resource and the component pattern.

In an embodiment according to the present disclosure, the CSI-RS indication information further includes a multiplexing manner of the ports on the component; the information of the component includes a component pattern, a position of one of the at least one component, and relative positions between the at least one component.

In an embodiment according to the present disclosure, the CSI-RS indication information is configured in a following signaling manner:

the CSI-RS indication information is configured by an RRC signaling, and one of following information is indicated by a DCI signaling or a MAC CE signaling:

not transmitting the CSI-RS, or transmitting the CSI-RS in a zero power manner;

an updated position of the component or an updated position of the CSI-RS resource; and transmitting the CSI-RS normally.

In an embodiment according to the present disclosure, the CSI-RS indication information is configured in a following signaling manner:

a number of ports for the resource, a component pattern, a position of one of the at least one component and the relative positions between the at least one component are configured an RRC signaling; and the multiplexing manner of the ports on the at least one component are configured by a MAC CE signaling.

In an embodiment according to the present disclosure, the CSI-RS indication information is configured in a following signaling manner:

a number of ports for the CSI-RS resource, a component pattern and the multiplexing manner of the ports on the at least one component are configured by an RRC signaling; and the position of one of the at least one component and the relative positions between the at least one component are configured by a MAC CE signaling; or a position of the CSI-RS resource is configured by the MAC CE signaling.

In an embodiment according to the present disclosure, the CSI-RS indication information further includes an identification number of the CSI-RS resource, where a CSI-RS sequence is generated by a pseudo-random sequence, the pseudo-random sequence is initialized by the identification number of the CSI-RS resource; the identification number of the CSI-RS resource is an identification number of a resource carrying the CSI-RS or an identification number of a resource carrying CSI-RS other than the CSI-RS.

In an embodiment according to the present disclosure, the CSI-RS indication information further includes a beam identification number; wherein a CSI-RS sequence is generated by a pseudo-random sequence, the pseudo-random sequence is initialized by the beam identification number.

In an embodiment according to the present disclosure, each component corresponds to a beam identification number, and a pseudo-random sequence corresponding to the each component is initialized by the beam identification number corresponding to the each component; or each port group corresponds to a beam identification number, and a pseudo-random sequence corresponding to the each port group is initialized by the beam identification number corresponding to the each port group.

In an embodiment according to the present disclosure, the CSI-RS indication information further includes a quasi-co-location identification number, where a CSI-RS sequence is generated by the quasi-co-location identification number.

The quasi-co-location identification number refers to an appointment to identify transmission considered to be performed at a same position.

In an embodiment according to the present disclosure, when the CSI-RS and a phase tracking reference signal are transmitted on a same RE, the CSI-RS is transmitted in a zero power manner on a RE corresponding to the CSI-RS, or the CSI-RS is not transmitted;

when the CSI-RS and a data demodulation reference signal are transmitted on a same RE, the CSI-RS is transmitted in the zero power manner on a RE corresponding to the CSI-RS, or the CSI-RS is not transmitted.

In an embodiment according to the present disclosure, when the CSI-RS and a phase tracking reference signal are transmitted on a same RE, the phase tracking reference signal is transmitted in a zero power manner on a RE corresponding to the CSI-RS, or the phase tracking reference signal is not transmitted;

where the CSI-RS is a zero power CSI-RS or a non-zero power CSI-RS.

In an embodiment according to the present disclosure, when the CSI-RS and a phase tracking reference signal are transmitted on a same RE, one of the CSI-RS or the phase tracking reference signal is determined to be transmitted in a zero power manner on a RE corresponding to the one of the CSI-RS or the phase tracking reference signal according to a rule configured by the first communication node; or one of the CSI-RS or the phase tracking reference signal is not transmitted on the RE corresponding to the one of the CSI-RS or the phase tracking reference signal.

The CSI-RS is a zero power CSI-RS or a non-zero power CSI-RS.

The phase tracking reference signal is a zero power phase tracking reference signal or a non-zero power phase tracking reference signal.

In an embodiment according to the present disclosure, the CSI-RS further has a quasi-co-location attribute, and the quasi-co-location attribute has two of following candidate types:

type 1: ports in a CSI-RS resource are quasi-co-location;

type 2: ports in a component are quasi-co-location;

type 3: ports in a code division multiplexing group are quasi-co-location;

type 4: ports in a CSI-RS resource set are quasi-co-location; and type 5: ports in a CSI-RS resource are not quasi-co-location.

The quasi-co-location ports are considered to transmit the CSI-RS at a same position.

In an embodiment according to the present disclosure, the first communication node selects one of the candidate types of the quasi-co-location attribute for configuration.

In an embodiment according to the present disclosure, the CSI-RS further has a function attribute, and a type of the function attribute of the channel state information reference signal is a quasi-co-location attribute type determined from the candidate types of the quasi-co-location attribute.

In an embodiment according to the present disclosure, the CSI-RS has a following type of a quasi-co-location attribute:
ports in a component are quasi-co-location;
the quasi-co-location ports are considered to transmit the CSI-RS at a same position.

In an embodiment according to the present disclosure, the CSI-RS has a following type of a quasi-co-location attribute:
ports in a code division multiplexing group are quasi-co-location;
the quasi-co-location ports are considered to transmit the CSI-RS at a same position.

It may be understood that, the corresponding relationship between the number X of ports and the set of component patterns involved in an embodiment of the present disclosure; a correspondence between the number X of ports and the relative positions between the components; a correspondence between the component pattern and multiplexing manner of the ports on components; or any one of correspondence relationships between the number X of ports, the component pattern and the multiplexing manner of the ports on the component may be preset and stored in a communication node, or may be indicated to the second communication node by the first communication node, after the first communication node obtains the correspondence relationship.

Based on the same or similar concepts as the above embodiments, one embodiment of the present disclosure further provides a computer readable storage medium that stores one or more programs that can be executed by at least one processor to implement any of the CSI-RS transmission methods according to the embodiments of the present disclosure.

Based on the same or similar concepts as the above embodiments, an embodiment of the present disclosure further provides a processor, the processor is configured to execute one or more programs for implementing any of the CSI-RS transmission methods according to the embodiments of the present disclosure.

Based on the same or similar concepts as the above embodiments, an embodiment of the present disclosure further provides a base station, the base station includes any of the CSI-RS transmission devices according to the embodiments of the present disclosure.

What is claimed is:

1. A channel state information reference signal (CSI-RS) transmission method, comprising:
    determining, by a first communication node, CSI-RS indication information;
    transmitting, by the first communication node, the CSI-RS indication information to a second communication node;
    transmitting or receiving, by the first communication node, a CSI-RS according to the CSI-RS indication information;
    wherein the CSI-RS indication information comprises a number of ports for a CSI-RS resource and information of at least one component;
    wherein the ports for the CSI-RS resource are used for transmitting the CSI-RS, and the CSI-RS resource is used for carrying the CSI-RS; the component is used for constituting the CSI-RS resource, and the component is a set of resource elements (REs) having relative positional relations;
    wherein the information of the component comprises a component pattern, the component pattern indicates that the ports are multiplexed on the component in a following manner: the ports are multiplexed on the component in a code division multiplexing manner, wherein a length of the code division multiplexing is equal to a number of REs comprised on the component.

2. The method according to claim 1, wherein the component pattern indicates relative positions between the at least one component.

3. The method according to claim 1, wherein the information of the component further comprises a position of one of the at least one component, and relative positions between the at least one component.

4. The method according to claim 3, wherein the CSI-RS indication information is configured in a following signaling manner:
    configuring the CSI-RS indication information by a radio resource control (RRC) signaling, and indicating one of following information by a downlink control information (DCI) signaling or a media access control control element (MAC CE) signaling:
    not transmitting the CSI-RS, or transmitting the CSI-RS in a zero power manner;
    an updated position of the component or an updated position of the CSI-RS resource;
    transmitting the CSI-RS normally.

5. The method according to claim 1, wherein in response to transmitting the CSI-RS and a phase tracking reference signal on a same RE, the CSI-RS is transmitted in a zero power manner on the RE corresponding to the CSI-RS, or the CSI-RS is not transmitted on the RE; or
    in response to transmitting the CSI-RS and a data demodulation reference signal on a same RE, the CSI-RS is transmitted in the zero power manner on the RE corresponding to the CSI-RS, or the CSI-RS is not transmitted on the RE.

6. The method according to claim 1, wherein the CSI-RS further has a quasi-co-location attribute, and the quasi-co-location attribute has two of following candidate types:
    type 1: ports in a CSI-RS resource are quasi-co-location;
    type 2: ports in a component are quasi-co-location;
    type 3: ports in a code division multiplexing group are quasi-co-location;
    type 4: ports in a CSI-RS resource set are quasi-co-location; and
    type 5: ports in a CSI-RS resource are not quasi-co-location;
    wherein the quasi-co-location ports are considered to transmit the CSI-RS at a same position.

7. A channel state information reference signal (CSI-RS) transmission method, comprising:
    receiving, by a second communication node, CSI-RS indication information transmitted by a first communication node; and
    transmitting or receiving, by the second communication node, a CSI-RS according to the received CSI-RS indication information,
    wherein the CSI-RS indication information comprises a number of ports for a CSI-RS resource and information of at least one component;
    wherein the ports for the CSI-RS resource are used for transmitting the CSI-RS, and the CSI-RS resource is used for carrying the CSI-RS; the component is used for constituting the CSI-RS resource, and the component is a set of resource elements (REs) having relative positional relations;

wherein the information of the component comprises a component pattern, the component pattern indicates that the ports are multiplexed on the component in a following manner: the ports are multiplexed on the component in a code division multiplexing manner, wherein a length of the code division multiplexing is equal to a number of REs comprised on the component.

8. The method according to claim 7, wherein the component pattern indicates relative positions between the at least one component.

9. The method according to claim 7, wherein the information of the component further comprises a position of one of the at least one component, and relative positions between the at least one component.

10. The method according to claim 7, wherein in response to transmitting the CSI-RS and a phase tracking reference signal on a same RE, the CSI-RS is transmitted in a zero power manner on the RE corresponding to the CSI-RS, or the CSI-RS is not transmitted on the RE; or
in response to transmitting the CSI-RS and a data demodulation reference signal on a same RE, the CSI-RS is transmitted in the zero power manner on the RE corresponding to the CSI-RS, or the CSI-RS is not transmitted on the RE.

11. The method according to claim 7, wherein the CSI-RS further has a quasi-co-location attribute, and the quasi-co-location attribute has two of following candidate types:
type 1: ports in a CSI-RS resource are quasi-co-location;
type 2: ports in a component are quasi-co-location;
type 3: ports in a code division multiplexing group are quasi-co-location;
type 4: ports in a CSI-RS resource set are quasi-co-location; and
type 5: ports in a CSI-RS resource are not quasi-co-location;
wherein the quasi-co-location ports are considered to transmit the CSI-RS at a same position.

12. A channel state information reference signal (CSI-RS) transmission device, configured in a first communication node and comprising:
a processor; and
a memory for storing instructions executable by the process,
wherein the processor, when executing the instructions, is configured to:
determine CSI-RS indication information;
transmit the CSI-RS indication information to a second communication node; and
transmit or receive a CSI-RS according to the CSI-RS indication information;
wherein the CSI-RS indication information comprises a number of ports for a CSI-RS resource and information of at least one component;
where the ports for the CSI-RS resource are used for transmitting the CSI-RS, and the CSI-RS resource is used for carrying the CSI-RS; the component is used for constituting the CSI-RS resource, and the component is a set of resource elements (REs) having relative positional relations;
wherein the information of the component comprises a component pattern, the component pattern indicates that the ports are multiplexed on the component in a following manner: the ports are multiplexed on the component in a code division multiplexing manner, wherein a length of the code division multiplexing is equal to a number of REs comprised on the component.

13. The device according to claim 12, wherein the component pattern indicates relative positions between the at least one component.

14. The device method according to claim 12, wherein the information of the component further comprises a position of one of the at least one component, and relative positions between the at least one component.

15. The device method according to claim 12, wherein in response to transmitting the CSI-RS and a phase tracking reference signal on a same RE, the CSI-RS is transmitted in a zero power manner on the RE corresponding to the CSI-RS, or the CSI-RS is not transmitted on the RE; or
in response to transmitting the CSI-RS and a data demodulation reference signal on a same RE, the CSI-RS is transmitted in the zero power manner on the RE corresponding to the CSI-RS, or the CSI-RS is not transmitted on the RE.

16. The device according to claim 12, wherein the CSI-RS further has a quasi-co-location attribute, and the quasi-co-location attribute has two of following candidate types:
type 1: ports in a CSI-RS resource are quasi-co-location;
type 2: ports in a component are quasi-co-location;
type 3: ports in a code division multiplexing group are quasi-co-location;
type 4: ports in a CSI-RS resource set are quasi-co-location; and
type 5: ports in a CSI-RS resource are not quasi-co-location;
wherein the quasi-co-location ports are considered to transmit the CSI-RS at a same position.

17. A channel state information reference signal (CSI-RS) transmission device, configured in a second communication node and comprising:
a processor; and
a memory for storing instructions executable by the process, wherein the processor, when executing the instructions, is configured to implement the method of claim 7.

* * * * *